United States Patent Office 3,840,510
Patented Oct. 8, 1974

3,840,510
FORMATION OF ELASTIC AND HIGH-TENACITY FIBERS FROM BUTENE-1 HOMOPOLYMERS AND COPOLYMERS
Charles L. Rohn, Somerville, N.J., assignor to Mobil Oil Corporation
Original application Feb. 5, 1971, Ser. No. 112,990, now Patent No. 3,686,385. Divided and this application June 5, 1972, Ser. No. 259,627
Int. Cl. C08f 3/12, 15/04, 47/22
U.S. Cl. 260—93.7
2 Claims

ABSTRACT OF THE DISCLOSURE

Fibers having properties of high elasticity or high tenacity are formed by drawing from the melt polybutene-1 or a copolymer of butene-1 with up to 20 mole percent propylene or ethylene and converting the drawn fiber to crystalline Form I, in the case of elastic fibers. The degree of elasticity or tenacity depends upon the draw down ratio and the crystallinity of the polymer used, and, in the case of high tenacity fibers, the melt temperature at the die orifice.

BACKGROUND OF THE INVENTION

This is a division of application Ser. No. 112,990, filed Feb. 5, 1971, now U.S. 3,686,385.

Field of the Invention

This invention is directed to a method for forming elastic or high-tenacity fibers from polybutene-1 or copolymers of butene-1 with ethylene or propylene.

Description of the Prior Art

Processes for making elastic fibers from polypropylene all appear to call for a heating treatment (annealing) step, sometimes with additional draw down in the cold or using a polymer containing an azido cross-linking agent. For example, U.S. No. 3,256,258 calls for spinning a polypropylene fiber and heat treating it at a temperature of 105° C.–160° C. U.S. No. 3,323,190 describes a process in which polypropylene is partially drawn from the melt, cooled, heat treated at 135° C.–150° C. and thereafter further drawn 40 to 80 percent. A process for melt spinning polypropylene while drawing down into fibers and then subjecting the fibers to heat treatment under non-stretching conditions at a temperature above 85° C. but below the melting point of the polymer is described in U.S. No. 3,330,897. U.S. 3,432,590 calls for a process of producing elastic polypropylene fibers which involves melt spinning, stretching, cold drawing, heat treating, and finally further cold drawing. U.S. 3,361,859 describes a process for spinning and drawing polypropylene and then cooling the fiber in a gaseous medium at a temperature decreasing with the distance from the spinneret, according to a time-temperature formula. In U.S. 3,377,415, there is described a process for spinning and heat treating polypropylene which calls for the addition of an azido cross-linking agent prior to spinning. U.S. 3,382,306 calls for formation of elastic polypropylene film which involves extruding and drawing the film, quenching and heat treating. U.S. 3,485,906 calls for a process similar to that of U.S. 3,377,415 except that an azido cross-linking agent is added to the polypropylene prior to fiber formation.

In Sen'i To Kogyo, 2(7), 516–23 (1969) there appears a review article on polyolefin fibers, used upon a lecture by Oya and Kitao. Although these authors discuss polybutene-1 fibers (relatively briefly) prepared by spin-drawing, they neither discuss nor appear to recognize the importance and significance of the correlation of polymer crystallinity, melt temperature, and draw down ratio to obtain elastic fibers or high tenacity fibers. The present invention discloses to this important correlation. The present inventor has further discovered that fibers drawn from a die must be converted from Form II to Form I, in order to obtain elastic fibers. The authors are silent on this point. The highest tenacity (g./denier) reported by the authors for polybutene-1 is 2–4. The applicant, on the other hand, defines methods for preparing such fibers having tenacities as high as 15 g./denier.

BRIEF DESCRIPTION OF THE INVENTION

The present invention provides a process for forming fibers having properties of elasticity or high tenacity which comprises melt drawing polybutene-1 or copolymers of butene-1 with propylene or ethylene and converting to crystalline Form I. The degree of elasticity or tenacity is a function of draw down ratio and the crystallinity of the polymer, and in the case of high tenacity fibers, on melt temperature at the die.

DESCRIPTION OF SPECIFIC EMBODIMENTS

The polymers used in preparing the fibers in accordance with this invention are called, generically herein, butene-1 based polymer. The term "butene-1 based polymer" is used to mean tactic polybutene-1, tactic random copolymers of butene-1 and up to 20 mole percent ethylene, and tactic random copolymer of butene-1 and up to 20 mole percent propylene. These polymers and copolymers are prepared using conventional Ziegler-Natta polymerization processes. A particularly feasible process is carried out using solution polymerization as described in U.S. 3,362,940. It is to be understood, however, that the method of making the butene-1 based polymer is not a critical factor herein, so long as the polymers are hightly tactic and contain some crystallinity.

The fibers are readily formed by extruding the butene-1 based polymer through a small die orifice and drawing down the extrudate while still in the molten state.

ELASTIC FIBERS

After the fiber is formed and is cooled to the solid state, in preparing elastic fibers, it is in the Form II crystallinity state. It must then be converted to the Form I crystalline state to form elastic fibers, in accordance with this invention. The transformation from Form II to Form I is carried out at room temperature (25°–30° C.) and usually takes from a few days up to as long as about 10 days. If the transformation is carried out at temperatures below 25° C. or above 30° C. the transformation is much slower. Accordingly, annealing the fiber at elevated temperatures, as called for by the prior art, is detrimental to the process of this invention. The transformation from From II to Form I can be carried out in a matter of about five minutes if the fiber is subjected to pressures in the order of about 30,000 p.s.i. If the draw down to form fiber is carried out using a copolymer of butene-1 and 5–9 mole percent propylene, as is described in U.S. 3,464,962, the transformation from Form II to Form I is extremely rapid. In fact, the transformation is so rapid that crystalline Form II is virtually undetectable in the freshly formed fiber.

Figure 1:
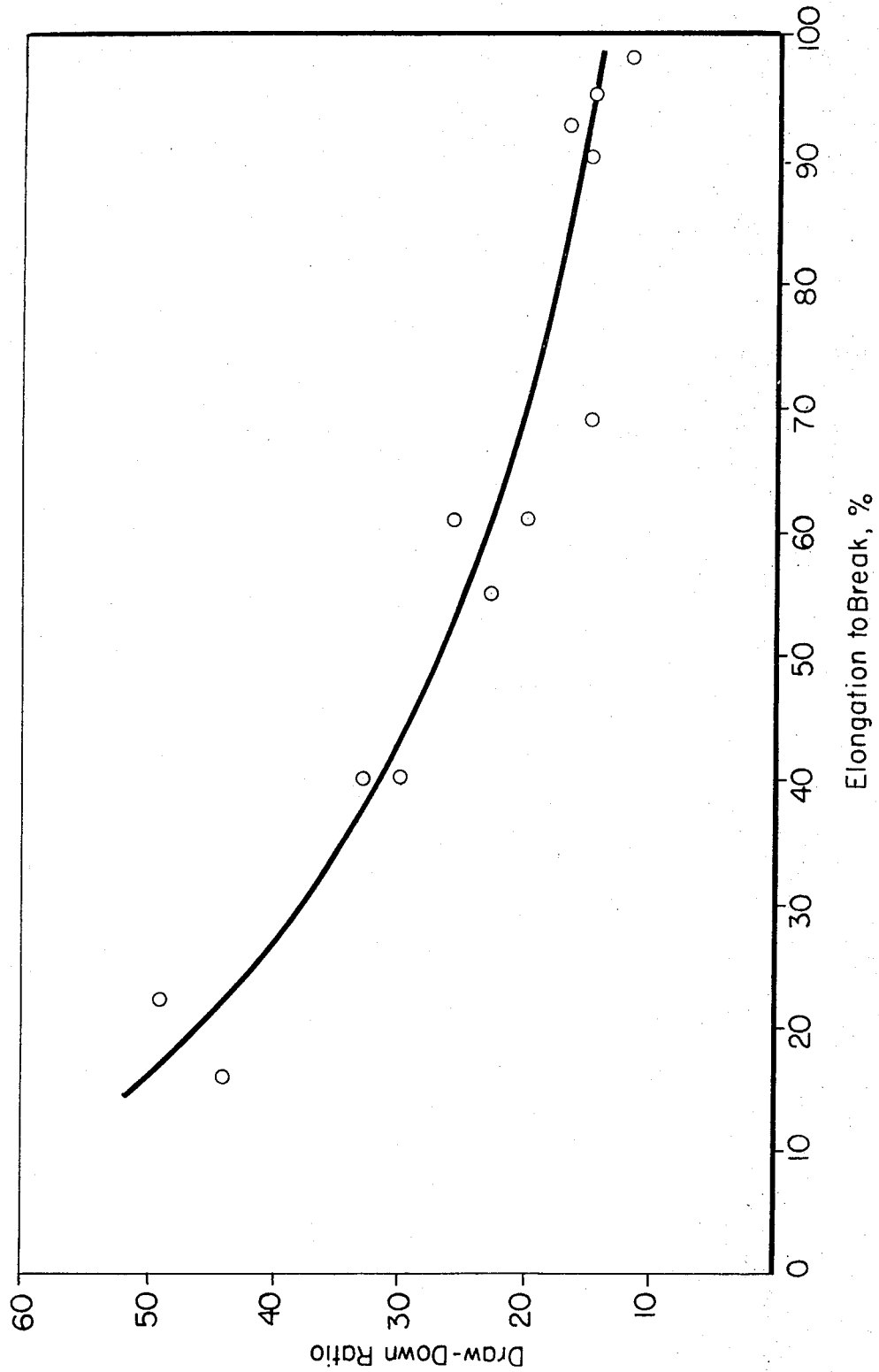
FIG. 1 presents a curve showing the relationship between draw down ratio and elongation to break for elastic fibers formed from polybutene of 53.5 percent crystallinity.

The degree of elasticity can be varied over a wide range depending upon the draw down ratio used and the crystallinity of the polymer. In FIG. 1, a curve is presented showing the relationship between draw down ratio and the elongation to break of fibers formed from polybutene-1 having 53.5 percent crystallinity, based upon a series of runs at various draw down ratios. As the draw down ratio is increased, the elongation decreases, i.e., the fiber becomes less elastic and tends to become more tenacious. There appears to be minimum elongation of about 15–20 percent even when draw down ratio is increased well above about 50. In general, elastic fibers are prepared using a draw down ratio between about 10 and about 50. The high tenacity fibers, on the other hand, are obtained using draw down ratios between about 10 and about 300, as discussed hereinafter and dependent on relationship between variables.

Figure 2:
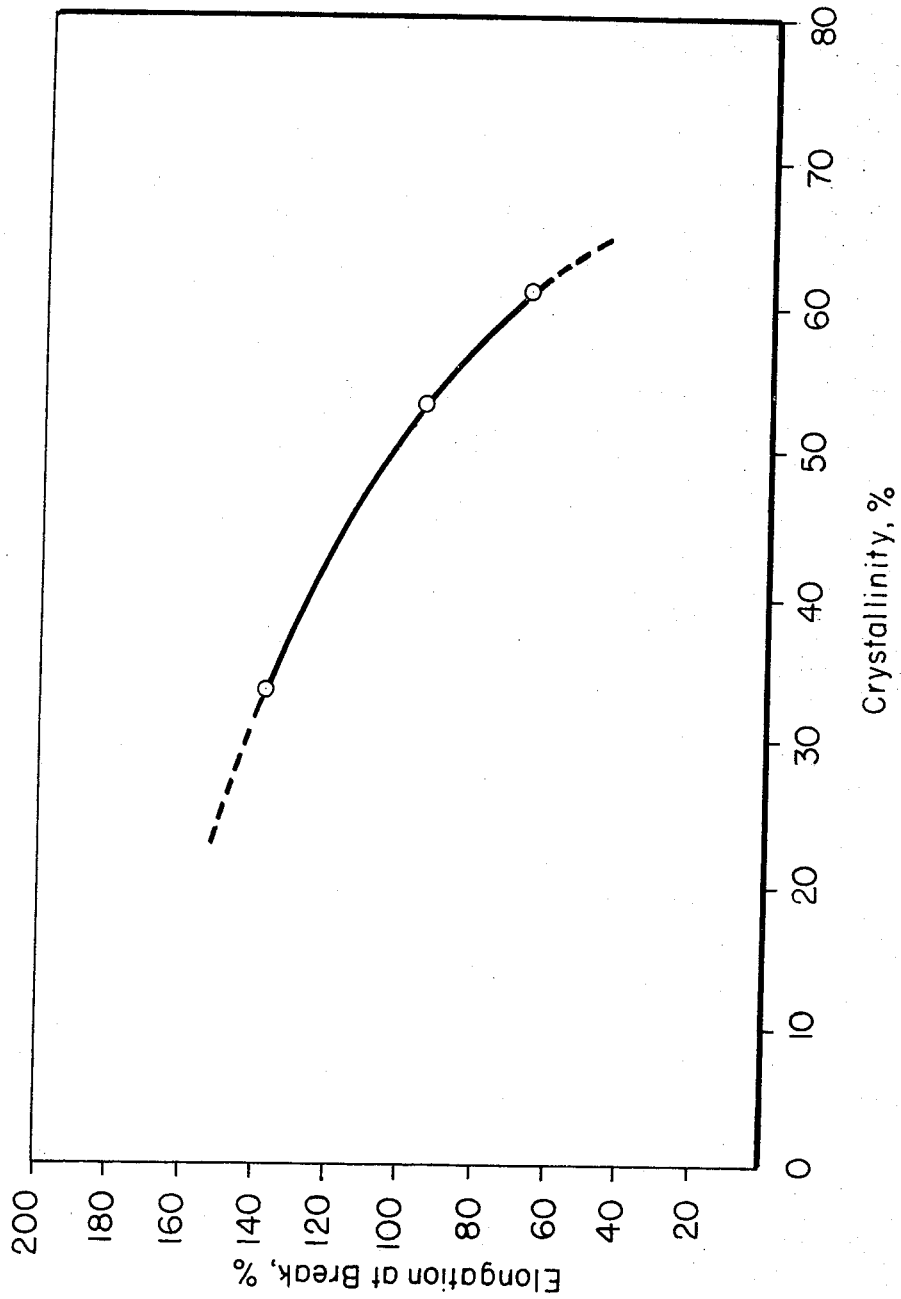
FIG. 2 shows a curve defining the relationship between the crystallinity of polybutene-1 and the elongation at break.

As has been indicated hereinbefore, the properties of the finished fiber are also depedent upon the crystallinity of the butene based polymer used. This is shown in FIG. 2 which presents a curve showing the relationship between the crystallinity and the percent elongation to break of fibers prepared from polybutene-1 polymers having varying degrees of crystallinity using a draw down ratio of about 13. It will be noted that, as crystallinity decreases, the elongation increases. This would appear to indicate that if a high elastic fiber is desired, it can be more conveniently prepared from a butene-1 based polymer of relatively low crystallinity. For comparison purposes, the fiber was made from polypropylene by extruding and drawing the molten polymer to a draw down ratio of 12, as described in U.S. Pat. 3,323,190. The fibers, after draw down, were heat treated for 10 minutes at 140° C. and then cold drawn 100 percent. The fiber was elongated 65 percent and permitted to relax. The fiber recovered 84 percent of its original length. Stress-strain extension and recovery with the polypropylene fiber shows that the degree of set is much higher (approximately 16 percent) for the polypropylene fiber than for polybutene-1 fiber.

A conventional method for measuring the elasticity of a fiber is by means of the so-called stress-strain relationship. This is demonstrated in FIGS. 3 and 4.

Figure 3:
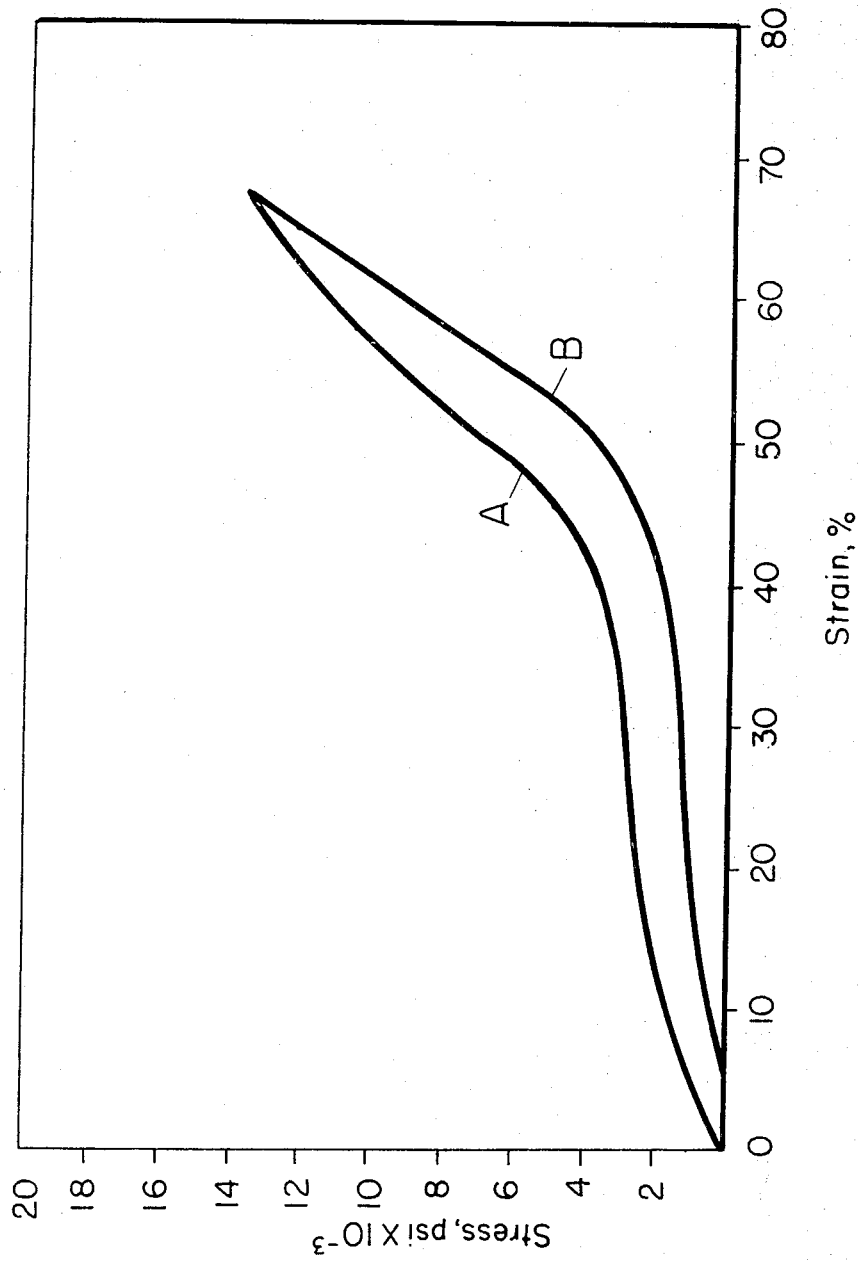
FIG. 3 presents a curve showing the relationship between the stress-strain extension and recovery of a fiber prepared from polybutene-1 having 53.5 percent crystallinity.

FIG. 3 presents the stress-strain relationship of a fiber prepared at a draw down ratio of 10, at a melt temperature of 190° C., using polybutene-1 having crystallinity of 53.5 percent. The data on the curve shown in FIG. 3 were obtained by stretching the fiber to a point below its break point while noting the amount of stress to give a given degree of strain, i.e., percent of stretch or elongation. Curve A shows this relationship while stretching the polybutene fiber and Curve B shows the relationship as stress is removed and the fiber is permitted to relax. It will be noted that the percent recovery of the fiber after stress was quite high. Indeed, within 24 hours the fiber has relaxed to its original length. The measurements shown in FIG. 3 were made at two minutes after relaxation of the fiber.

Figure 4:
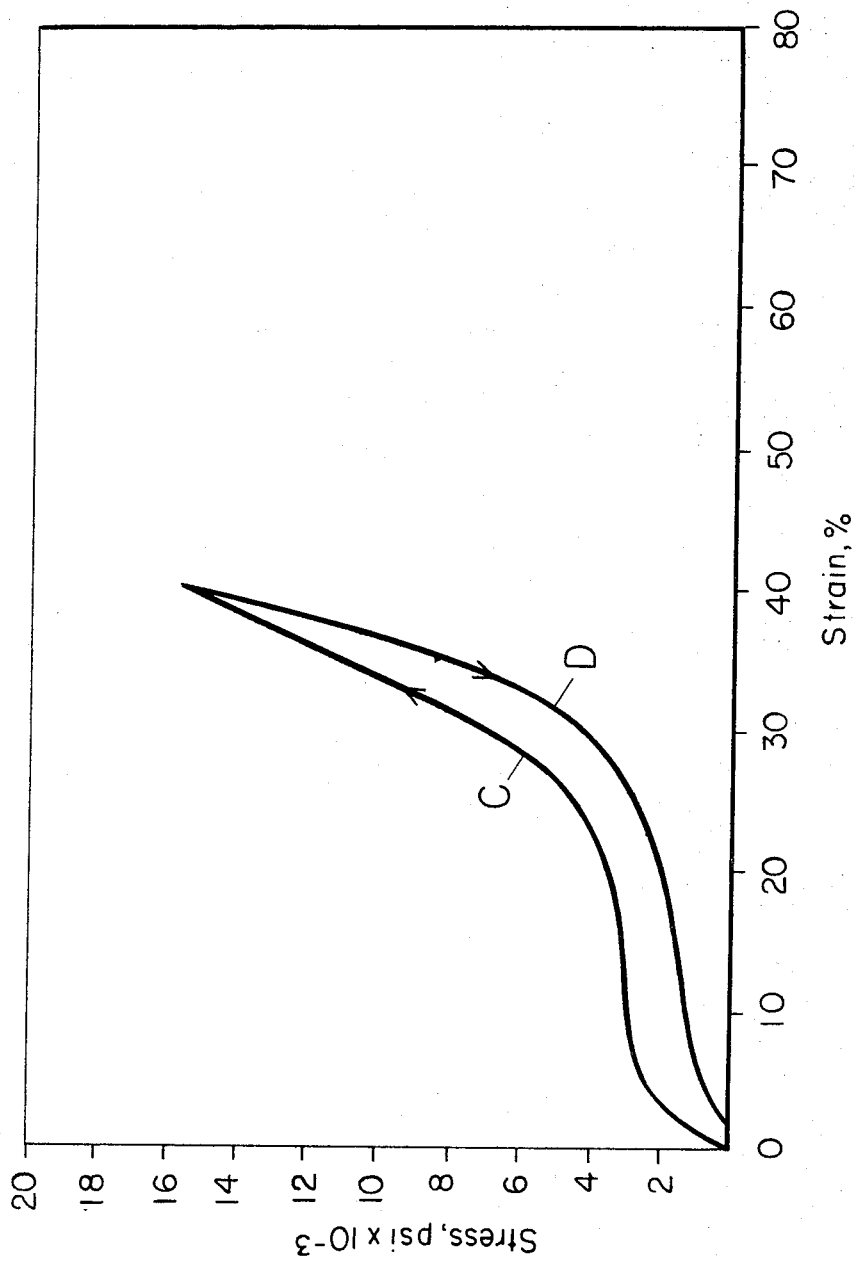
FIG. 4 shows a similar stress-strain relationship of a fiber prepared from polybutene-1 having a crystallinity of 61 percent.

FIG. 4 presents a stress-strain relationship of a fiber prepared from polybutene-1 having 61 percent crystallinity using a draw down ratio of 10, at a melt temperature of 190° C. Curve C shows the relationship while stress is being applied and Curve D shows the relationship upon relaxation. It will be noted again that the amount of recovery after two minutes was very high. It is also noteworthy that in comparing FIGS. 3 and 4 the fiber prepared from a more highly crystalline polybutene could be stretched to a lesser degree than that prepared from a less crystalline polybutene, although the recovery was greater.

Figure 5:
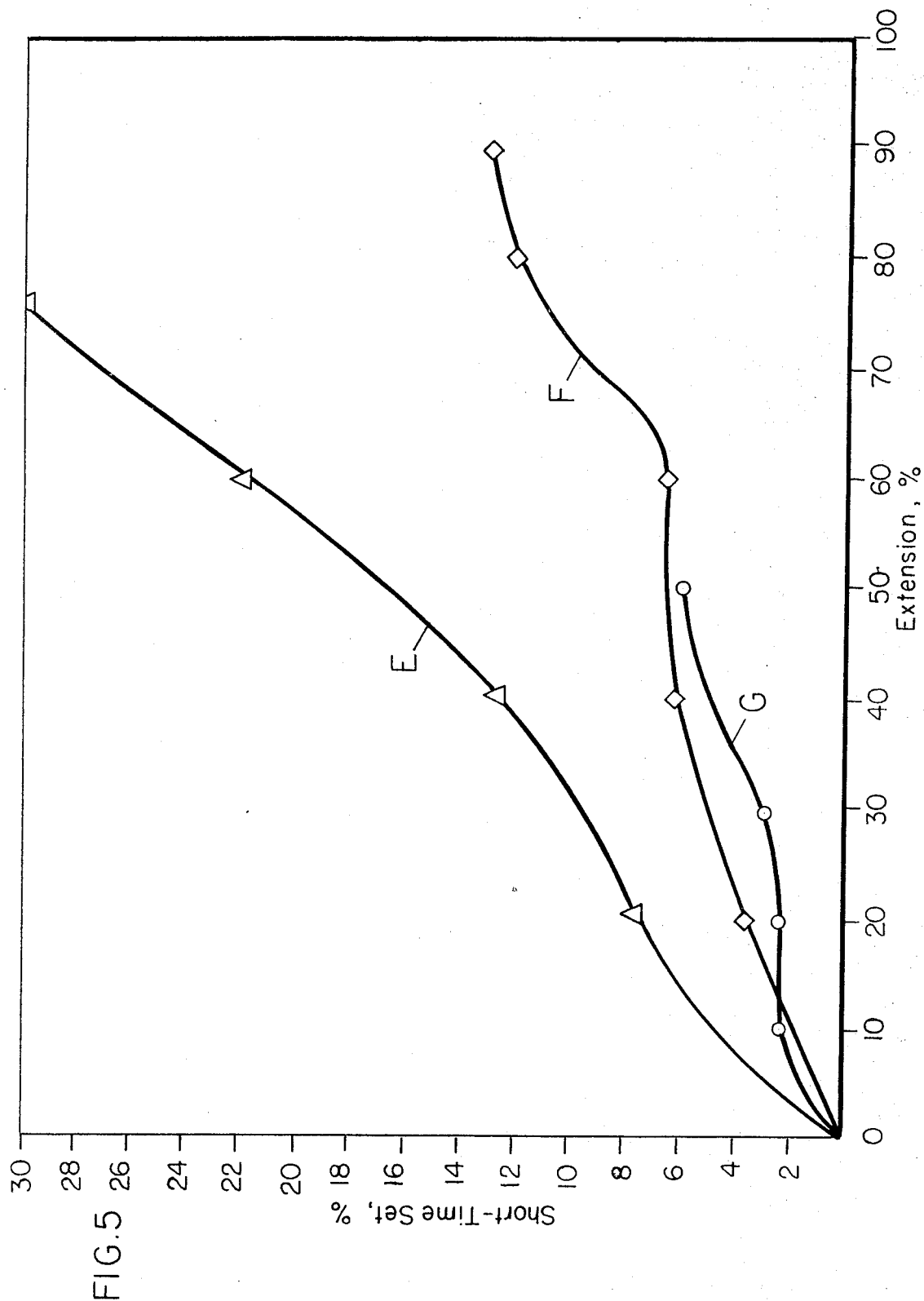
FIG. 5 presents a curve showing the short time set and percent extension for fibers prepared from polybutene having various crystallinities.

The recovery and "short time" set of elastic fibers made in accordance with this invention were measured at different amounts of stretching. The property of set is the ability of the fiber to return to its original length when it is relaxed after being subjected to single or repeated stresses. In this work, set was determined two minutes after the stretching force was relaxed. It has been found that by increasing the crystallinity of the fiber, the amount of short time set for extensions up to 50 percent is decreased. FIG. 5 presents curves showing the relationship between the short time set and percent extension of fibers prepared at a draw down ratio of 10, at a melt temperature of 190° C., with polybutenes of different crystallinities. Curve E was obtained using polybutene having 33 percent crystallinity. Curve F was obtained from a polybutene having a crystallinity of 53.5 percent and Curve G was obtained using a polybutene having a crystallinity of 61 percent. As shown in FIG. 5 the fibers prepared from polybutenes of lower crystallinity tend to have greater short time sets. The short time sets of these fibers, however, are not permanent and within 16–24 hours recover completely to their original length.

A series of fibers were prepared using polybutene-1 homopolymers having varying degrees of crystallinity and using varying draw down ratios. Stretch, recovery, and tensile data for fibers prepared from these polymers are set forth in Table I.

TABLE I

Poly(butene-1) homopolymer

| Draw down ratio | Stretch elongation, percent | Instantaneous recovery, percent | Tensile breaking strength, p.s.i. | Modulus (p.s.i.) | |
|---|---|---|---|---|---|
| | | | | Initial | 20% elongation |
| 15/1 | 117 | 98.0 | 13,400 | 32,800 | 3,500 |
| 15/1 | 95 | 98.0 | 14,300 | 32,800 | 3,500 |
| 15/1 | 90 | 98.0 | 15,200 | 32,800 | 3,000 |
| 20/1 | 62 | 96.0 | 20,400 | 41,500 | 11,600 |
| 23/1 | 55 | 97.0 | 51,900 | 45,900 | 8,400 |
| 44/1 | 25 | 98.0 | 57,000 | | |

Similarly, fibers were prepared from a copolymer prepared from 92 mole percent butene-1 and 8 mole percent ethylene, said copolymer having a crystallinity of about 39 percent, at various draw down ratios. Pertinent data for these fibers are set forth in Table II:

TABLE II 8 mole percent Ethylene 92 mole percent butene-1 copolymer

| Draw down ratio | Stretch elongation, percent | Instantaneous recovery, percent | Tensile breaking strength, p.s.i. |
|---|---|---|---|
| 6/1 | 150 | 96.2 | 11,800 |
| 10/1 | 71 | 96.0 | 25,400 |
| 15/1 | 78 | 95.0 | 56,000 |
| 28/1 | 36 | 94.0 | 99,000 |

ELASTIC VS. HIGH TENACITY FIBER

Figure 6:
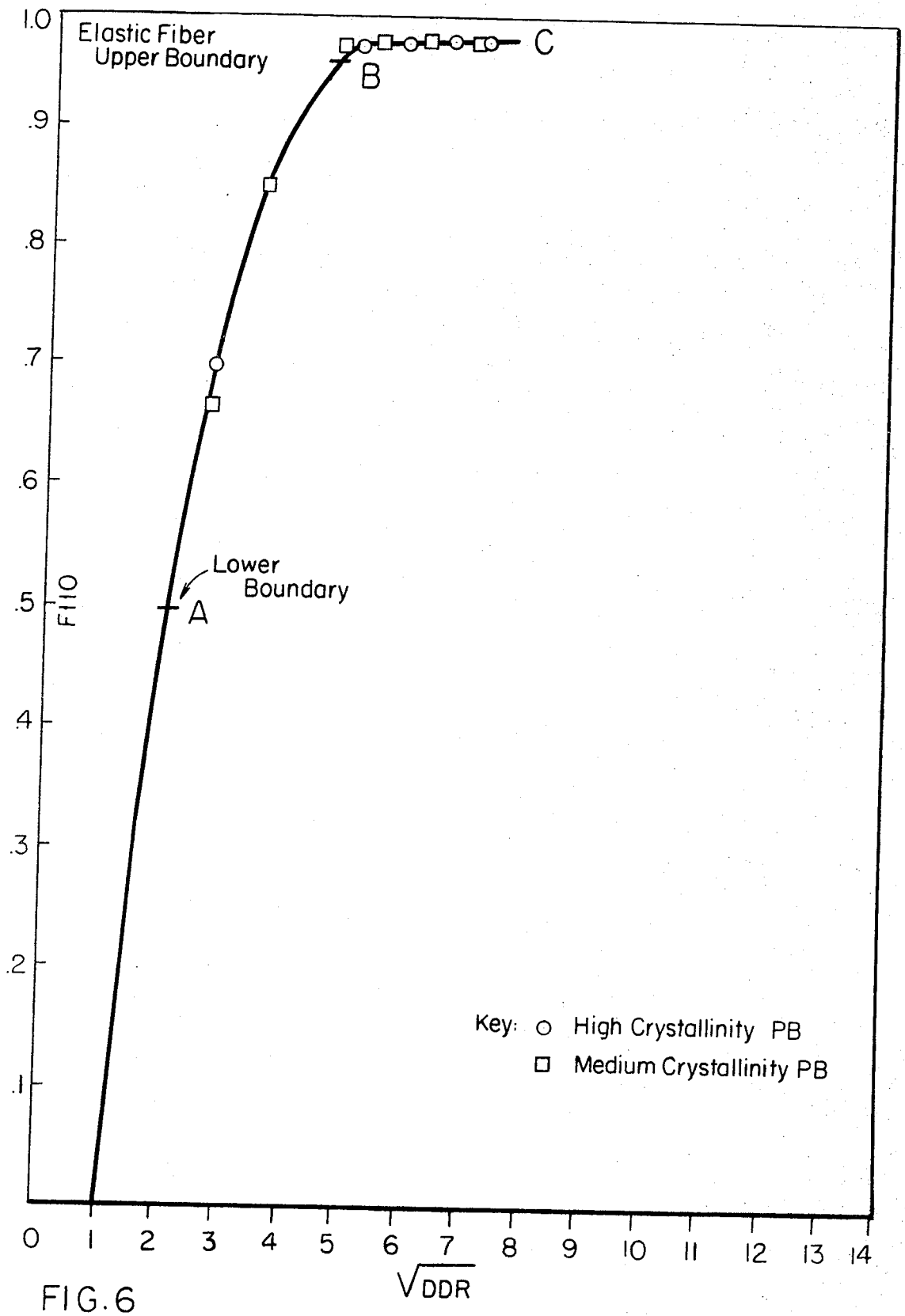
FIG. 6 presents a curve showing the relationship between the draw down ratio of polybutenes of high crystallinity and medium crystallinity and the crystallite orientation index.

It has been found that by following the operations within the parameters of this invention, there is a correlation between the crystalline orientation index and the draw down ratio which appears to be independent of the crystallinity. The curve in FIG. 6 was obtained from azimuthal beams on the (110) reflection of Form I modification of polybutene-1 for fibers drawn in accordance with this invention. On the curve in FIG. 6, there is plotted the $F_{110}$ vs. the square root of the draw drawn ratio. In this work, a portion of the curve between A and B represents the area for elastic fibers. The portion of the curve from B to C represents the area for high tenacity fibers.

HIGH TENACITY FIBERS

There are two main factors in addition to draw down ratio (DDR) that affect the tenacity of polybutene based polymer fibers. These are, melt index (M.I.) of the polymer and the melt temperature in the die. As is well known to those familiar with the art, draw down ratio is the ratio between the diameter of the die orifice to the diameter of the final fiber. Tensile strength and tenacity are related by the following formula:

Tensile strength, p.s.i.

$$= 12{,}800 \times \text{Tenacity}, \frac{\text{g.}}{\text{denier}} \times (\text{specific gravity})$$

Figure 7:
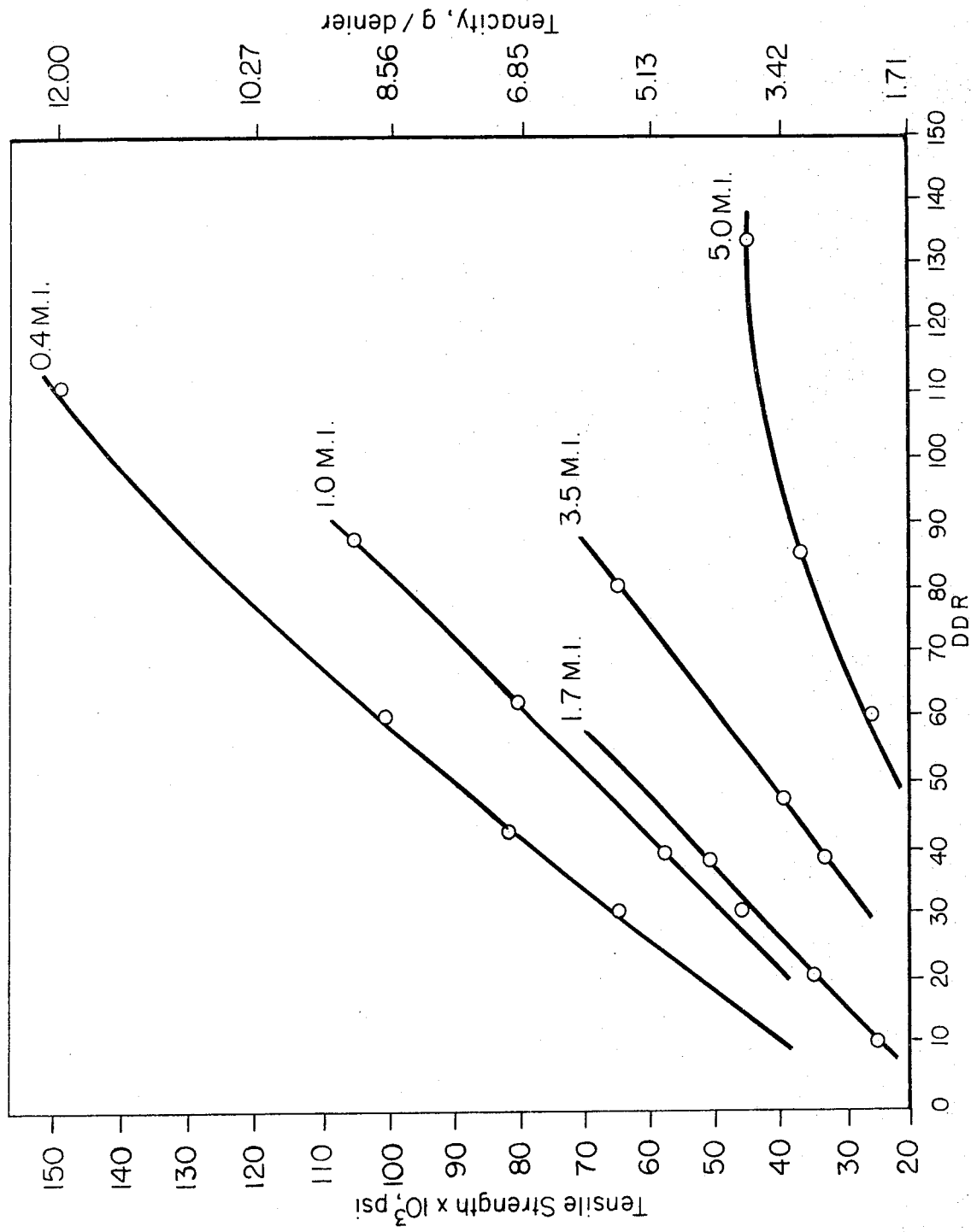
FIG. 7 presents curves showing the relationship between tensile strength (and tenacity) and draw down ratio and melt index (M.I.) of polybutenes drawn at a melt temperature of 190° C.

FIG. 7 shows how the tenacity (tensile strength) of polybutene fibers increase with increasing M.I. when drawn over a range of DDR at 190° C. melt temperature. In general, the highest tenacity fiber is obtained with the lowest M.I. material for a given melt temperature and maximum DDR. For example, a 0.4 M.I. fiber and a 5 M.I. fiber, both drawn at a DDR of 140 and melt temperature of 190° C., have tenacities of 14 g./denier and 4 g./denier, respectively.

Figure 8:
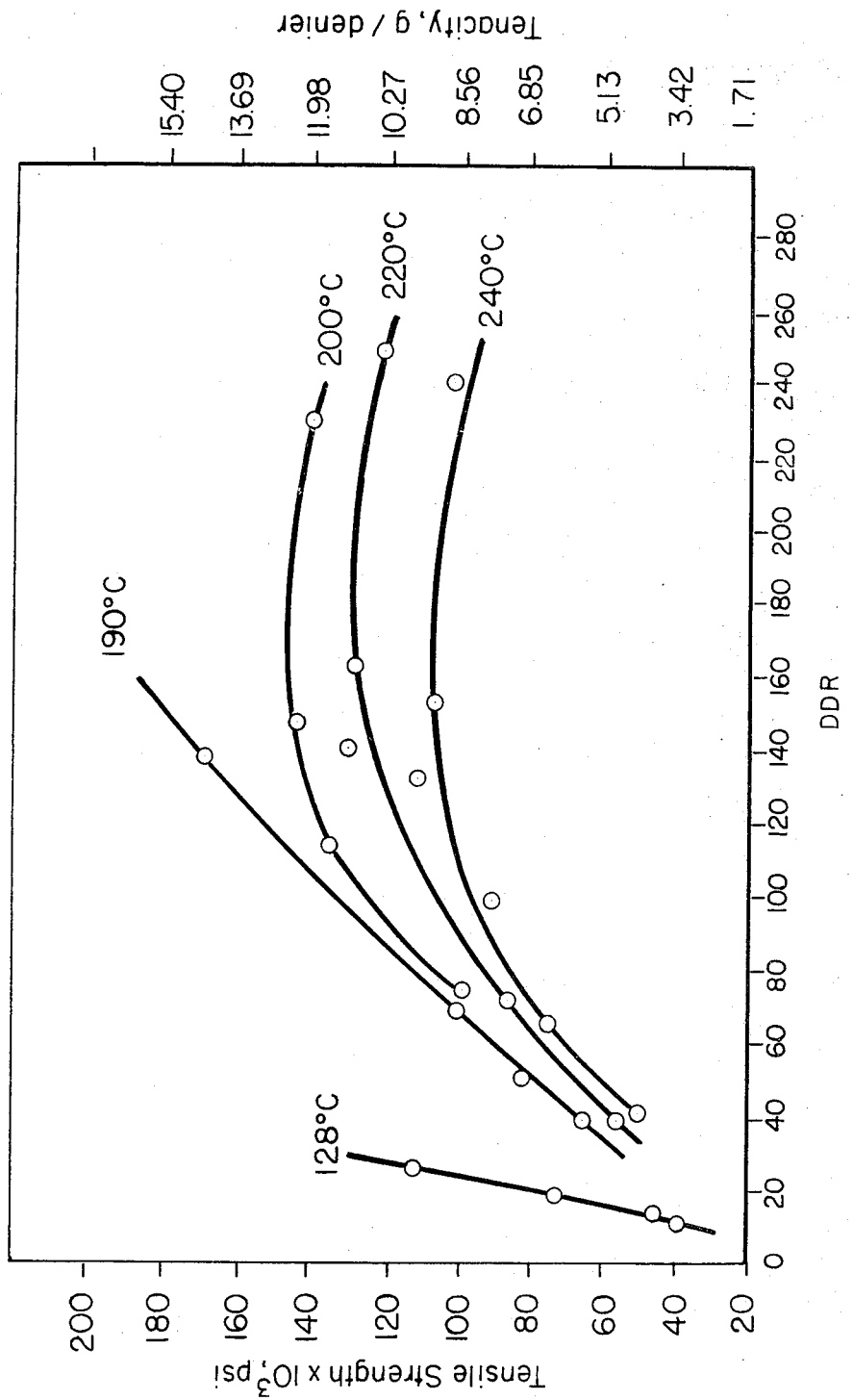
FIG. 8 presents curves showing the relationship between tensile strength (and tenacity) and draw down ratio and melt temperature of a polybutene-1 having a melt index of 0.4.

Increasing temperature affects the tenacity of polybutene fibers in a similar way that M.I. does. FIG. 8 shows how the tenacity of 0.4 M.I. polybutene fiber decreases with increasing melt temperature. For each isotherm, the tenacity increases linearly with increasing DDR, and then reaches a plateau or upper limit. This limit decreases with increasing melt temperature.

Butene based polymer fibers with tenacities greater than 4 g./denier can only be made within certain ranges of M.I. and melt temperatures. These ranges are specified in the following table.

CONDITIONS FOR MAKING PB-1 FIBERS WITH TENACITIES ABOVE 4 G./DENIER

| M.I.: | Melt temperature range, ° C. | Minimum DDR |
| --- | --- | --- |
| 20 | 122–180 | 170 |
| 15 | 122–185 | 165 |
| 10 | 122–190 | 165 |
| 5 | 122–210 | 150 |
| 3.6 | 122–220 | 50 |
| 1.0 | 122–273 | 20 |
| 0.4 and less | 122–273 | 14 |

The reason 4 g./denier was taken as a lower limit of tenacity is because conventional fiber spinning processes can be used which will make poly(butylene) fibers with tenacities between 2–4 g./denier. Also, conditions exist for the melt drawing process that will produce fibers in this tenacity range. For example, polybutene fiber with M.I. of 5 and drawn at a melt temperature of 240° C. and a maximum DDR has a tenacity of 3.1 g./denier and a break elongation of 47%. Note that these tensile properties are similar to those of the poly(butylene) fibers reported on page 20 of the translation of article *Spinning and Properties of Poly(olefin) Fibers* by Seigo Oya and Tashio Kitao. (P. 522 of the original Japanese article.)

As will be noted from the foregoing description, fibers can be prepared having a wide range of elasticity and tenacity properties by the process of this invention. Thus, the crystallinity and draw down ratios can be selected to give a desired property depending upon the intended end use. If dimensional stability is the primary requirement, such as in the case of men's suits or tailored clothing, then the available stretch levels should be 20–30 percent. On the other hand, if comfort is the primary requirement, as in the case of sportswear, the stretch level should be about 25–40 percent. Tensioned slacks with foot stirrups use more of the available fabric stretch than any other outer wear garment. The stretch level for such slacks should be about 40–50 percent.

The fibers produced by the process of this invention can also be used to make ropes. If high strength is required, the ropes should be made from fibers having high tenacity. If, on the other hand, a rope is desired that has a certain amount of "give," as in the case of safety lines or tow ropes, then elasticity would be a more desirable factor at the expense of lesser tenacity.

SUMMARY

In general in reducing fibers from butene based polymer, in accordance with this invention, the draw down ratio can be between about 10 and about 300. The melt temperature can be between about 120° C. and about 270° C. The butene based polymer can have a crystallinity of between about 30 percent and about 65 percent and a melt index of between about 0.4 or less and about 20. In the preparation of elastic fibers, the drawn down ratio will be between about 10 and about 50 and the $F_{110}$ will be between about 0.5 and 0.965. In the case of high tenacity fibers, the correlation between variables will be as tabulated hereinbefore.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. An elastic fiber of tactic polybutene-1, a tactic random copolymer of butene-1 and up to 20 mole percent ethylene, or a tactic random copolymer of butene-1 and up to 20 mole percent propylene, wherein the $F_{110}$ of the fiber in Form I is between about 0.5 and 0.965.

2. A high tenacity fiber of tactic polybutene-1, a tactic random copolymer of butene-1 and up to 20 mole percent ethylene, or a tactic random copolymer of butene-1 and up to 20 mole percent propylene formed by melt drawing said polymer or copolymer from a die with a relationship between variables of:

| M.I.: | Melt temperature range, ° C. | Minimum DDR |
| --- | --- | --- |
| 20 | 122–180 | 170 |
| 15 | 122–185 | 165 |
| 10 | 122–190 | 155 |
| 5 | 122–210 | 150 |
| 3.6 | 122–220 | 50 |
| 1.0 | 122–273 | 20 |
| 0.4 and less | 122–273 | 14 | said fiber having a tenacity between about 4 g./denier and about 15 g./denier.

References Cited
UNITED STATES PATENTS
3,686,385   8/1972   Rohn _____ 264—176 F JOSEPH L. SCHOFER, Primary Examiner A. HOLLER, Assistant Examiner U.S. Cl. X.R.

260—88.2 S, 94.9 GD; 264—176 F, 210 F

UNITED STATES PATENT OFFICE
CERTIFICATE OF CORRECTION

Patent No. 3,840,510    Dated October 8, 1974

Inventor(s) Charles L. Rohn

It is certified that error appears in the above-identified patent and that said Letters Patent are hereby corrected as shown below:

| | |
|---|---|
| Column 1, line 68, | "used" should be --based--. |
| Column 2, line 47, | "indix" should be --index--. |
| Column 3, line 15, | "From II" should be --Form II--. |
| Column 5, line 53, | "165" should be --155--. |

Signed and sealed this 4th day of February 1975.

(SEAL)
Attest:

McCOY M. GIBSON JR.
Attesting Officer

C. MARSHALL DANN
Commissioner of Patents